United States Patent Office.

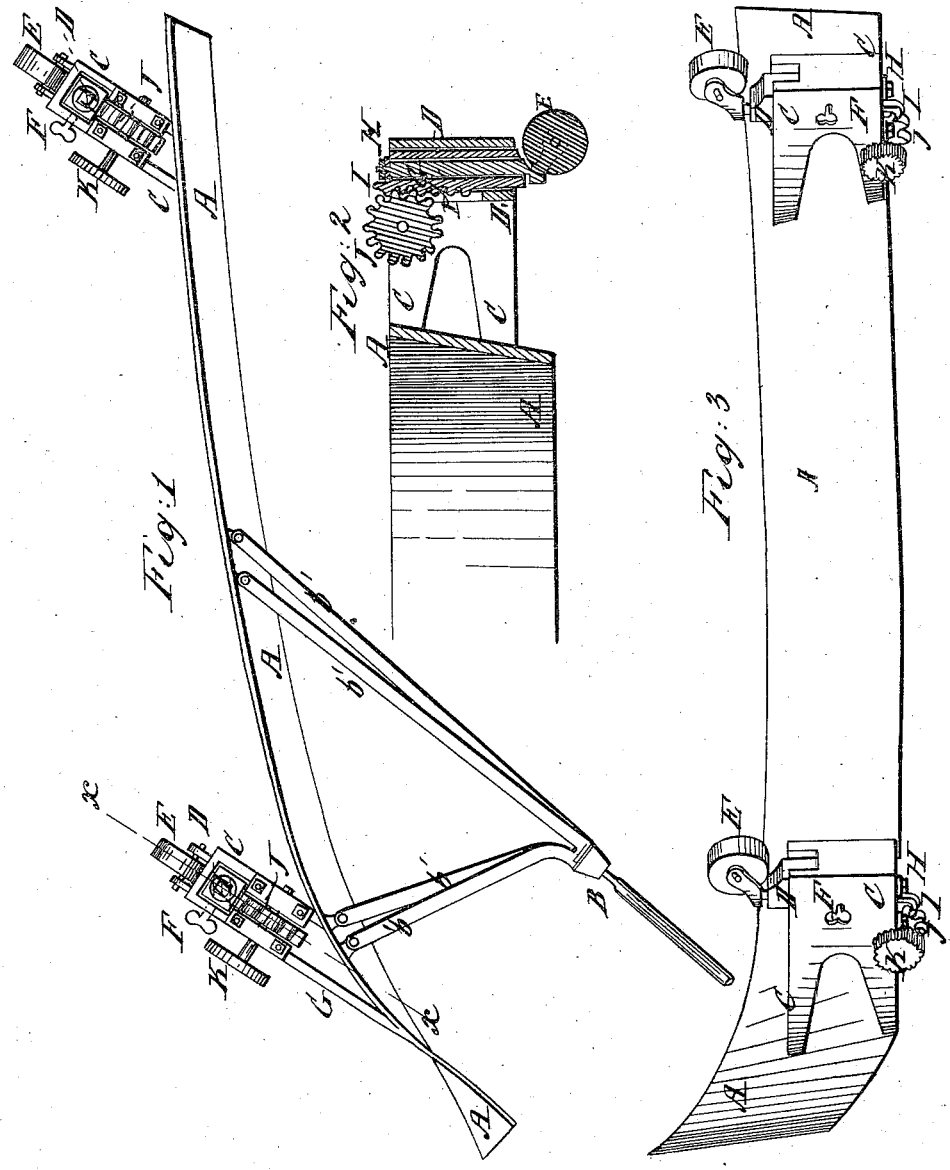

GEORGE H. WHITE, OF HUNTINGTON, NEW YORK.

Letters Patent No. 63,771, dated April 9, 1867.

---

IMPROVED ROAD-SCRAPER.

---

The Schedule referred to in these Letters Patent and making part of the same.

---

TO ALL WHOM IT MAY CONCERN:

Be it known that I, GEORGE H. WHITE, of Huntington, Suffolk county, New York, have invented a new and useful Improvement in Road-Scraper; and I do hereby declare that the following is a full, clear, and exact description thereof, which will enable others skilled in the art to make and use the same, reference being had to the accompanying drawings, forming part of this specification, in which—

Figure 1 is a top or plan view of my improved road-scraper.

Figure 2 is a detail sectional view of the same taken through the line $x\,x$, fig. 1.

Figure 3 is a rear view of the same inverted.

Similar letters of reference indicate corresponding parts.

My invention has for its object to furnish an improved scraper for roads by means of which the dirt may be scraped up and spread evenly over the roadway or over any desired part of said roadway; and it consists in the construction and form of the scraper-plate, in the combination of pivoted or caster-wheels with the scraper, and in the combination of a pinion-wheel and rack with the wheels, the whole being constructed and arranged as hereinafter more fully described.

A is the scraper-plate, which is made substantially in the form shown in figs. 1 and 2, that is to say, its lower edge is curved, as shown in fig. 3, so as to give the desired form to the roadway; and the forward end of said lower edge projects downward and forward, so as to act as a plough to loosen up the earth, which is then carried backward and sidewise and spread over the roadway by the following parts of the scraper-plate. B is the tongue, which is securely and rigidly connected to the scraper by the braces $b'$, as shown in fig. 1, so that the said scraper-plate A may advance at about an angle of forty-five degrees with the line of draught. To the rear side of the scraper A, near each end, are attached vertical boxes C, extending back in lines about parallel with the line of draught of the machine. In the rear part of the boxes C are formed compartments, into which are fitted the blocks D, to which the wheels E are pivoted. The blocks D are held at any elevation to which they may be raised by the set-screws F passing in through the sides of the boxes C and pressing against the sides of the blocks D. The blocks D are perforated perpendicularly for the reception of the shanks G of the wheels E, which are secured in place by the nuts H, screwed upon the upper ends of the shanks G and resting upon the upper ends of the blocks D or upon the washers placed thereon. Upon the forward sides of the blocks D are formed, or to them are attached, racks I, into the teeth of which mesh the teeth of the pinion-wheels J, which are pivoted to the sides of the boxes C, and which are operated by hand-wheels K, attached to the projecting ends of their axles, as shown in fig. 1. By this construction the blocks D may be raised and lowered, as desired, to adjust the position of the wheels E. This enables either or both ends of the scraper to be raised or lowered, so as to deposit the dirt upon any desired part of the roadway. It also enables the wheels E to be lowered, so that the scraper may be carried upon the said wheels from place to place without the scraper-plate A coming in contact with the surface of the ground. If desired, a ploughshare or additional plate may be attached to the forward lower corner of the scraper-plate A. This may be done when the plate is new, but with more decided advantage when the plate has become somewhat worn.

I claim as new, and desire to secure by Letters Patent—

1. The scraper-plate A, constructed substantially in the form and manner herein shown and described.

2. The combination of the pivoted or caster-wheels E with the scraper, substantially as herein shown and described and for the purpose set forth.

3. The combination of the pinion-wheels J and racks I with the pivoting blocks D of the wheels E, substantially as herein shown and described and for the purpose set forth.

The above specification of my invention signed by me this 13th day of February, 1867.

GEO. H. WHITE.

Witnesses:
WM. F. McNAMARA,
JAMES T. GRAHAM